May 28, 1929.  F. R. PETERS  1,714,619
LOCOMOTIVE BOOSTER APPARATUS
Filed March 14, 1925   3 Sheets-Sheet 2

INVENTOR
Frank R. Peters
BY Synnestvedt + Lechner
ATTORNEYS

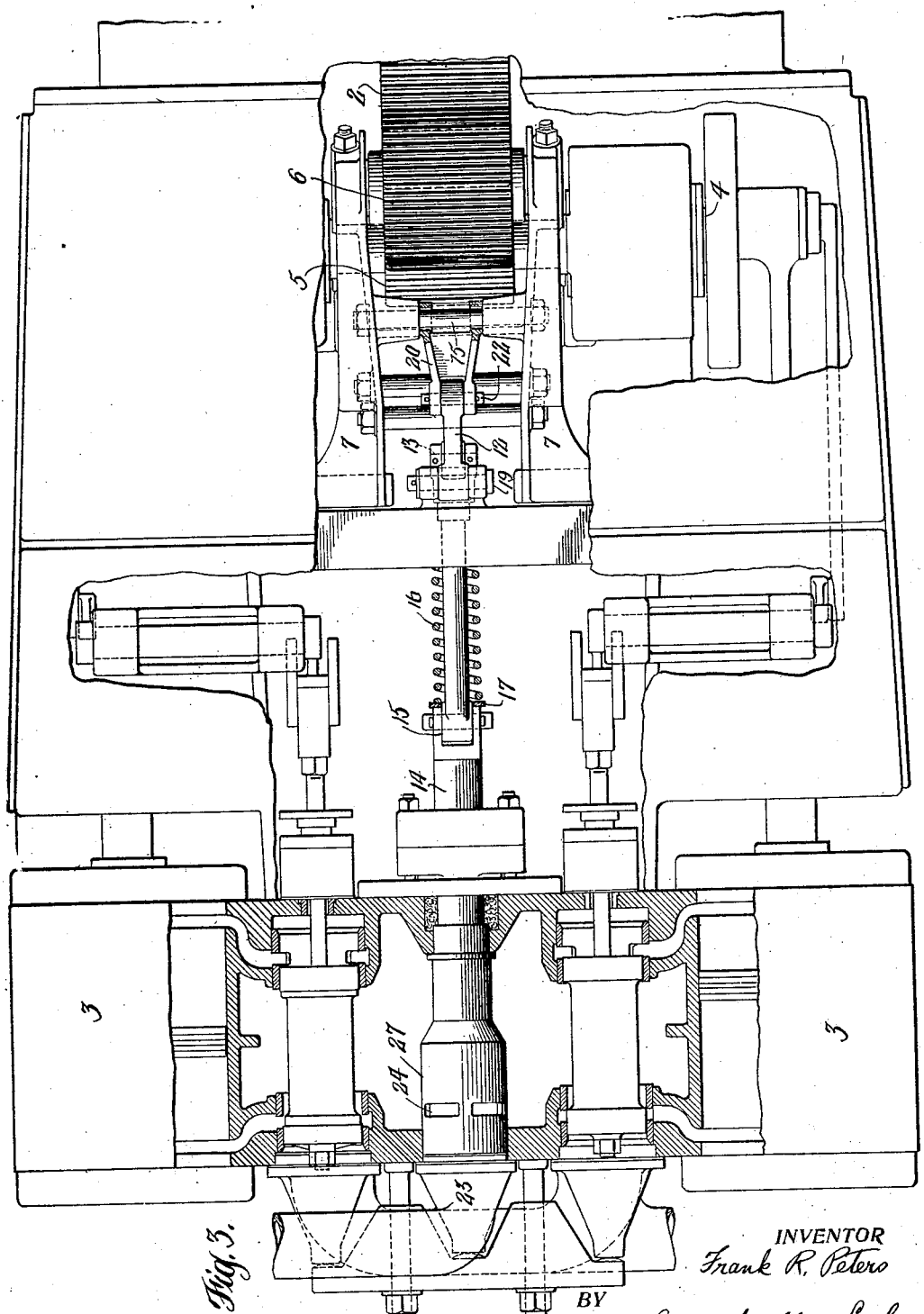

Patented May 28, 1929.

1,714,619

UNITED STATES PATENT OFFICE.

FRANK RICHARD PETERS, OF NEW YORK, N. Y., ASSIGNOR TO FRANKLIN RAILWAY SUPPLY COMPANY, A CORPORATION OF DELAWARE.

LOCOMOTIVE-BOOSTER APPARATUS.

Application filed March 14, 1925. Serial No. 15,610.

This invention relates to locomotive booster apparatus of the kind which is designed to aid or boost the locomotive either at starting or at slow pulling up a heavy grade. Such boosters are not intended to perform any driving function after the locomotive attains a certain given speed which may be anywhere from ten to twenty or slightly more miles per hour.

Booster motors are usually arranged to drive a load bearing axle either on the locomotive itself or on the tender and because of the fact that they are not intended to operate at all times they are provided with suitable entraining mechanism. The wheels of the axles to which boosters are applied are considerably smaller than the main drivers of the locomotive and it is therefore apparent that at high speeds the booster axle would be rotating considerably faster than the axles of the drivers which is one of the reasons why the booster must be disentrained after the locomotive attains a given speed.

Furthermore, at slow speeds there is an available surplus of steam in the boiler and this surplus is utilized or drawn upon to drive the booster. If the booster were kept in operation after the locomotive had attained its average running speed it would be liable to dangerously decrease the available pressure for the main drivers.

In equipping a locomotive or its tender with a booster motor it is, of course, highly desirable that no unnecessary complications in the control of the locomotive be introduced. In manipulating the various controlling devices for the locomotive itself the engineer has about all that he can conveniently attend to without danger to the safety of the train. Booster equipments, therefore, have been arranged with more or less automatic controlling systems which have been subordinated to a greater or less degree to the devices which are normally manipulated by the engineer in controlling the locomotive.

With the foregoing in mind the objects of my invention will be more clearly understood. In the first place I provide an improved apparatus for entraining the booster which is actuated by the steam for operating the booster in the course of its progress to the booster cylinders. In such an arrangement I provide apparatus which will ensure entrainment of the booster prior to the time that operating steam is admitted to the booster cylinders while at the same time providing for a supply of "idling" steam so that there will be no danger of clashing gears during the entraining operation.

I also provide a controlling system which will enable the engineer to idle the booster at will without causing entrainment thereof so that he can warm up the booster motor and free it of condensation prior to the time that its driving power is required. In this way it is possible to have the booster "go to work" immediately after it is cut in. In equipments heretofore in use particularly in winter, this did not always occur and it gave rise to incidental troubles which my arrangement overcomes.

In connection with the mechanism just referred to I provide an operating piston valve device which is responsive to the supply of steam for the booster and which is arranged to control a port in the conduit for such steam supply so that the initial motion of the piston will substantially complete entrainment without opening the port and so that a continued motion in the same direction will uncover the port without affecting the entrainment device. In other words there is a lost motion connection between the entrainment device and the power means for actuating it.

I also construct and arrange the parts so far mentioned so that after entrainment has once taken place it will be maintained by the pressure of the idling steam even though the supply of operating steam is cut off for some reason or other. And in this latter connection further objects of the invention reside in the provision of a means for supplying the booster with operating steam from the steam chest or the steam supply line of the locomotive and the provision of an arrangement for supplying the idling steam from an independent source. In other words the supply of operating steam to the booster is subject to the control of the main locomotive throttle but the idling steam is not.

I also provide a pilot device which prevents entrainment or operation of the booster until after pressure exists in the steam supply line of the locomotive which means until after the main locomotive throttle has been opened.

A further object of the invention resides in the provision of a manually actuated valve by means of which it is possible to initiate either the idling of the booster or the entrainment and operation thereof, which valve is so arranged that it operates to disable one phase of the control while the other one is functioning.

The foregoing together with other objects which will be more apparent from a consideration of the accompanying drawings in the light of the following specification are obtained by means of a construction which is illustrated in preferred form in the accompanying drawings wherein Fig. 1 is a diagram of my improved booster apparatus;

Fig. 3 is a plan view and

Figure 1:
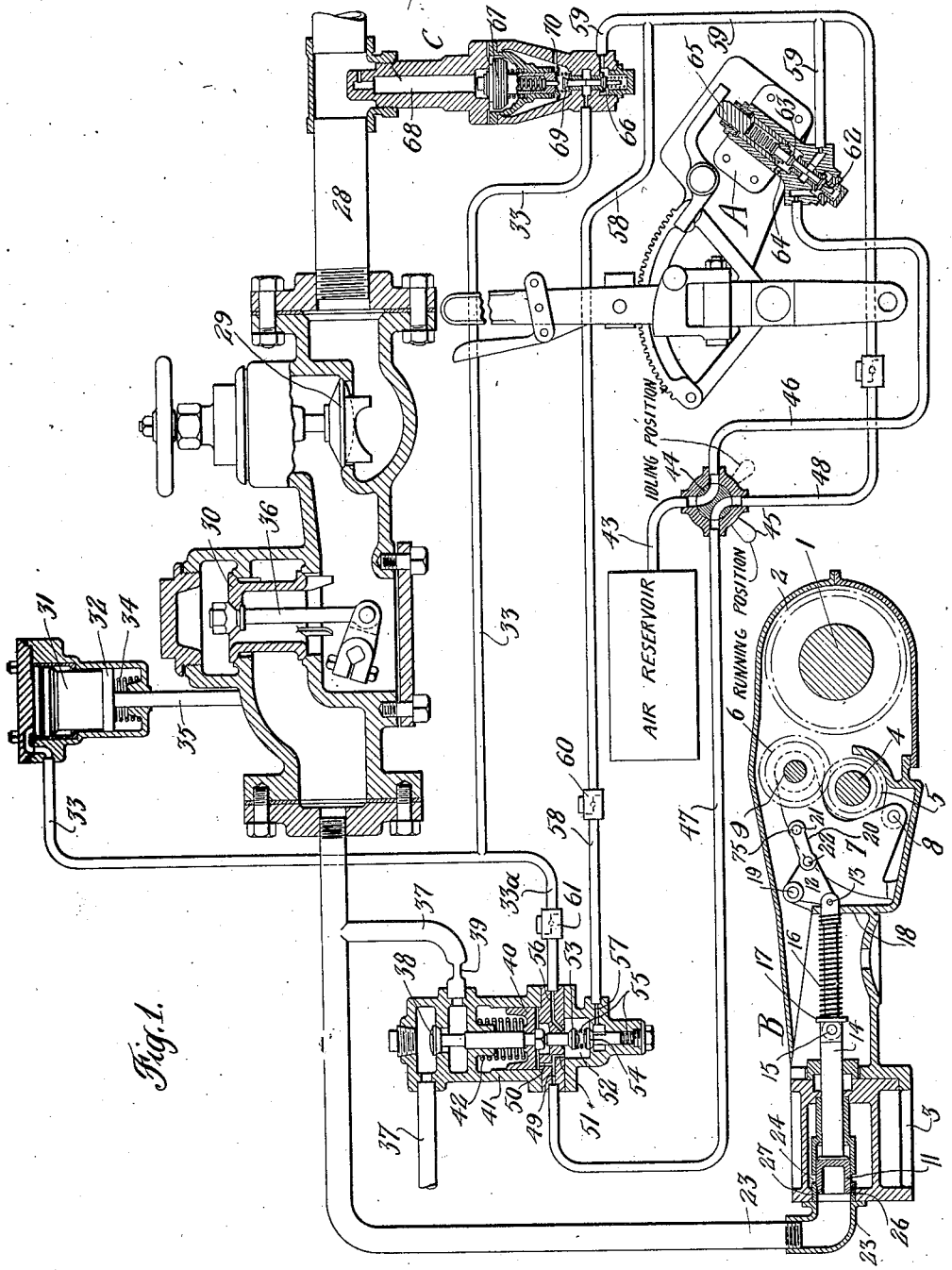

Referring to the drawings and particularly to Fig. 1 it will be seen that the booster motor B is arranged to drive the axle 1 which, as said, may be a load bearing axle either on the locomotive itself or on its tender. A driven gear 2 is fixed on the axle. The cylinders 3 of the booster motor are arranged to drive the crank shaft 4 upon which is mounted the driving pinion 5. Entrainment of the booster is effected by means of the movable idler gear 6 mounted upon the rocking member 7 which pivots at the point 8. The gear 6 is always in mesh with the driving pinion 5 and by moving the rocker 7 to the right on its pivot 8 the gear 6 can be thrown into mesh with the gear 2 on the axle. The idler gear bearing pin 9 is arranged to abut against the stops 10 which stops limit the movement of the rocker.

The source of power for moving the rocker is found in the piston 11 which is connected to the toggle 12 at the point 13. The piston rod 14 is jointed at 15 so that the right hand end of the rod is free to move up and down slightly, such motion being necessary during the course of entrainment and disentrainment. The piston works against the force of the spring 16 seated at one end upon the washer 17 and at the other upon the upstanding web 18 which forms a part of the booster framework. The spring 16 will act, therefore, to return the parts when disentrainment of the booster takes place.

The toggle 12 swings around its pivot 19 and connection to the rocker 7 is made by means of the link 20 pivoted at 21 upon the rocker and at 22 upon the toggle. The hole 74 in the link is elongated so as to permit movement of the piston 11, as will appear, without affecting the rocker.

Figure 2:
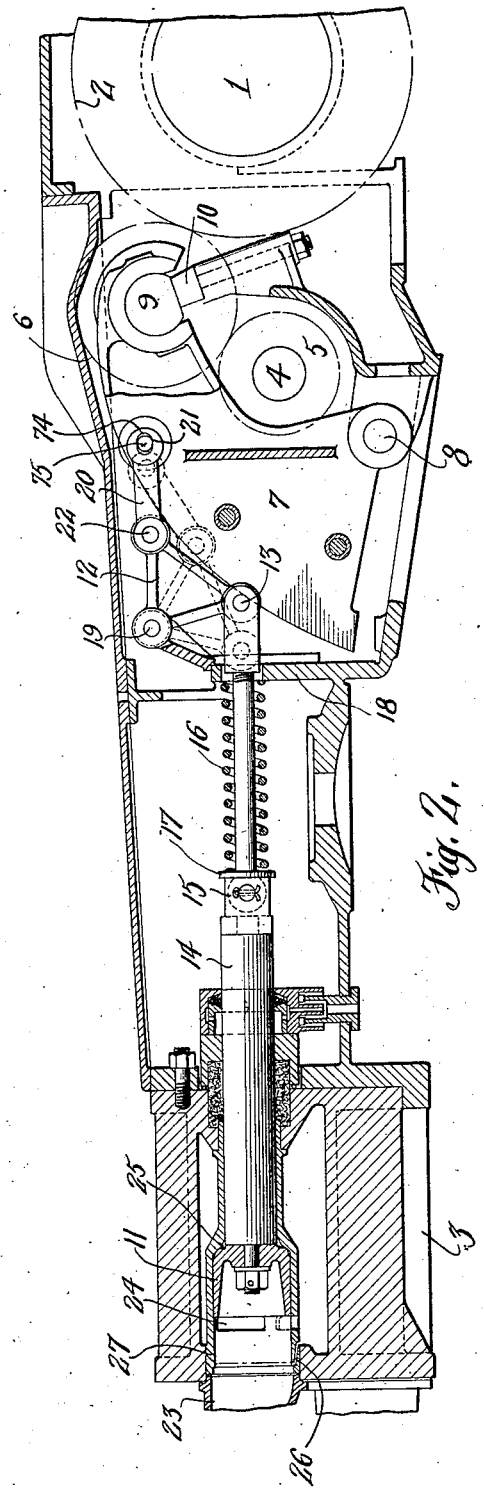
Fig. 2 is a vertical longitudinal section illustrating the details of the entraining mechanism and some of its associated parts.
Figure 4:
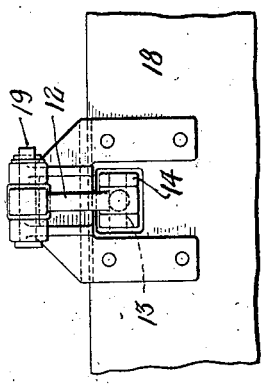
Fig. 4 is an elevation of a detail of the construction.

Fig. 2 illustrates the various parts just described in full lines in the positions they occupy when the booster is entrained. In the same figure the dotted line positions of the parts show them when the booster is disentrained. The parts are so arranged as to cause substantially complete entrainment of the idler gear 6 with the driven gear 2, or in other words with the pin 9 against the stops 10, during approximately the first half of the stroke of the piston 11. This will be apparent because as the point 22 moves to the right it also moves upwardly, its upward motion being considerably greater than its motion toward the right but the motion toward the right being sufficient to cause the complete entrainment as aforesaid. Then after entrainment has taken place the piston 11 has a considerable portion of its available stroke remaining. This provision is for an important feature now to be explained.

The steam for driving the booster is delivered thru the pipe 23 and the piston 11 is arranged to control the flow of operating steam thru this pipe or conduit 23. In its retracted position the piston 11 completely closes the large port 24 and it will maintain closure of this port during approximately the first half of its stroke or until the gear 6 meshes with the gear 2 and the bearing pin 9 has come up against the stops 10. When this takes place continued motion of the piston to its seat 25 will uncover the port 24 and steam to operate the booster cylinders and the driving pinion 5 will be permitted to pass the piston 11. The continued motion is possible because of the elongated slot 74 around the pin 75 carried by the rocker 7, the operation being as follows. The axle gear 2, of course, must rotate in a clockwise direction since the booster has been designed to drive the locomotive forwardly. The pinion 5, therefore, rotates in the same direction and the idler gear 6 in the reverse or counterclockwise direction. The resultant of the forces thus set up causes the idler gear 6 to be pulled into complete mesh with the axle gear 2 just as soon as any driving action is initiated. This action leaves the pin 75 somewhere near the right hand end of the slot 74 so that the entraining piston 11 can continue its motion to uncover the port 24 without affecting the pin 75 or the rocker 7 upon which it is mounted, the link 20 moving to the right with relation to the pin 75 during such movement of the piston 11. In other words there is a lost motion connection between the piston 11 or the source of power and the entraining mechanism.

By means of extensive experiments applicant has found that this is essential to satisfactory operation of a booster motor of this type. If this were not provided for and the gears were brought to a point at which the teeth would only partially mesh at the time that full operating pressure was delivered to the booster cylinders, the torque produced by the booster would act to draw the gears into mesh and the bearing pin seat upon its stops with a force entirely too great to be practical.

It is desirable, however, to admit just enough steam to the booster cylinders to easily rotate the driving pinion 5 and the idler gear 6 so as to ensure meshing of the gear 6 with the gear 2. This is provided for by means of the comparatively small capacity by-pass 26 in the wall of the cylinder 27 in which the piston 11 reciprocates. This by-pass is sufficiently large to admit enough steam to produce what is known as "idling" of the booster and as will appear a little further on in this specification it performs an important function in enabling the engineer to "warm up" the booster prior to throwing it into operation and to clear it of all water of condensation. The by-pass, therefore, performs two functions, namely, first—the function of permitting a small quantity of steam to rotate the pinion 5 and the gear 6 should the teeth on the gear 6 and on the gear 2 abut against each other during the entrainment operation; and second—to permit the passage of idling steam to the booster cylinders. This idling steam will not be of sufficient pressure to move the piston 11 to cause entrainment but after entrainment has taken place the idling steam is arranged to maintain such entrainment even through the entraining and operating pressure is removed for any cause. However, this will now be described somewhat more in detail.

The steam for entraining and operating the booster as a driving factor is supplied through the pipe or conduit 28 which conduit is connected to the locomotive supply line at some point between the locomotive throttle and the steam chest of the locomotive valves. In other words the supply of entraining and operating steam for the booster motor is dependent upon the position of the locomotive throttle. If the engineman has opened the locomotive throttle steam will be present in the pipe 28 but if not there will be no pressure in this pipe.

Interposed between the pipes 28 and 23 are the hand operated shut off valve 29 and the booster throttle 30. The booster throttle is opened by the booster throttle operating piston 31 mounted within the cylinder 32. When fluid pressure is admitted to the face of the piston 31 thru the supply conduit 33 said piston will move downwardly against the force of spring 34 and by means of any suitable connection between its piston rod 35 and the stem 36 of the booster throttle valve 30 such downward motion can be translated into an upward opening motion of the throttle 30.

Before actually using the booster motor as a driving factor it may be desirable to warm it up or "idle" it, as it is expressed, and for accomplishing this I arrange to supply a small quantity of steam to the booster line 23 thru the steam pipe 37 which is controlled by what is known as the preliminary throttle valve 38. The steam entering thru the pipe 37 comes from a source independent of that which enters thru the pipe 28 and can be taken directly from the steam dome of the locomotive if so desired or from any other suitable place. The pipe 37 is provided with a chock 39 which is of somewhat smaller capacity than the by-pass 26 so that there will be no danger of building up sufficient pressure back of the piston 11 to cause entrainment of the gears during an idling operation.

The valve 38 is opened by means of the following motor device. A fluid actuated piston 40 mounted within the cylinder 41 is adapted to move upwardly against the spring 42 during opening movement of the valve 38.

I arrange to supply both the preliminary throttle operating piston and the main booster throttle operating piston with fluid pressure, preferably air, in the following manner. The air enters the control system thru the pipe 43 which may be connected to the air reservoir on the locomotive. This supply is under the control of a manually actuated valve 44 provided with the handle 45. This valve is preferably gravity or spring loaded in such a way that it normally establishes communication between the pipe 43 and the pipe 46 and between the pipe 47 and the pipe 48. The effect of these connections will be described a little later. For the present the connections which the valve 44 establishes for the purpose of idling the booster will be considered. When the handle 45 is swung to its right hand position the valve 44 establishes communication between the pipe 43 and the pipe 47 and between the pipe 48 and the pipe 46.

Air pressure will then flow thru the pipe 47 to the passage 49 in the preliminary throttle operating motor or device. A branch 50 of the passage 49 leads to the face of the piston 40 and a branch 51 leads to the chamber 52 in which are located the valves 53 and 54. When the piston 40 is in its retracted or downward position the valve 54 will be seated and the valve 53 will be open but just as soon as the piston 40 moves upwardly to open the preliminary throttle valve 38 the springs 55 will operate to open valve 54 and shut valve 53. Valve 53 controls the passage 56 which leads to the branch 33ª of the pipe 33 and the valve 54 controls the passage 57 leading to the pipe 58. Both the pipes 48 and 58 lead into the pipe 59 connecting the reverse lever pilot valve A with the steam actuated pilot device C, both of which are described hereinafter.

When the air pressure is thus admitted to the face of the piston 40 thru the pipe 47 the preliminary throttle valve 38 will be opened and the booster will idle just as long as the engineman holds the valve handle 45 in its right hand position. Air pressure cannot pass out either into the pipe 33ª or into the pipe 59. There is a check valve 60 in the pipe 58 and a check valve 61 in the pipe 33ᵃ. The check valve 61 is for safety purposes in case the valve 53 does not seat properly and close off the passage 56.

If the valve 44 is in its normal or running position the reverse lever pilot valve A is in control of the booster operating system in the first instance. This reverse lever pilot valve A is provided with two oppositely seating valves 62 and 63, the former controlling the passage of air from pipe 46 to pipe 59 and the latter controlling the flow of air from pipe 59 to exhaust port 64.

A plunger mechanism 65 projects outwardly from the reverse lever pilot valve and is adapted to be engaged by the reverse lever of the locomotive or by some suitable part attached thereto when the reverse lever is in the corner or nearly so, as it is colloquially expressed. When the plunger 65 is not depressed air cannot flow from pipe 46 to pipe 59 and the controlling system for the booster is therefore inoperative. Valve 63 however is open so that exhaust can take place thru the exhaust port 64. When the plunger 65 is depressed valve 62 is opened and the booster controlling system is placed in operation and the valve 63 is closed.

It will thus be seen that the operation of the booster is subordinated to the operation of the locomotive itself. Entrainment and operation of the booster as a driving factor is also subordinated to the control of the locomotive by a further pilot device already indicated as C.

After the air reaches the device C it is blocked in its progress by virtue of the valve 66 but just as soon as the main locomotive throttle is opened and pressure accumulates in the pipe 28 this valve 66 will be opened because the piston 67 will be moved downwardly under the influence of the steam pressure entering thru the passageway 68. This downward movement opens the valve 66 and closes the valve 69 thereby shutting off communication between the pipe 33 and the exhaust port 70.

Having thus described all of the various parts involved in my improved booster apparatus and briefly indicated their several functions I will now briefly summarize the operation. The booster motor has been inoperative but the engineer desires to avail himself of its driving power. First he pulls the handle 45 of the valve 44 to the right hand or idling position. This will admit air pressure to the preliminary throttle operating device in the manner already described and thereby provide sufficient steam from an independent source to ensure idling of the booster without entrainment thereof. After this operation is completed the valve 44 is permitted to assume its normal position whereupon, if the plunger 65 is depressed by the reverse lever of the locomotive, air pressure will be admitted to the balance of the booster controlling system. It cannot, however, reach the booster throttle operating piston 31 thru the pipe 33 unless pressure is already existing in the pipe 28. Neither can the preliminary throttle be opened for the flow of air thru the pipe 58 is blocked by means of the valve 54, said valve 54 being held downwardly against its seat by virtue of the fact that the piston 40 is in its downward position. Nothing further will happen, therefore, until such time as pressure exists in the pipe 28 which will be after the locomotive throttle has been opened. When this pressure moves the piston 67 downwardly the air can pass onwardly thru the pipe 33 to the operating piston 31 of the booster throttle as well as thru branch 33ᵃ, passage 56, chamber 52 and passages 51 and 50 to the face of the piston 40. The preliminary throttle valve 38 and the booster throttle valve 30 will be opened substantially simultaneously but just as soon as the piston 40 moves upwardly the valve 53 will seat and the valve 54 will open so that air will be admitted thru passage 57, chamber 52 and passages 51 and 50 to maintain the piston 40 in its upward position and the preliminary throttle valve in its open position. With the booster throttle 30 in its open position steam will then pass on thru the pipe 23 to entrain the booster and operate it as a driving factor in the manner previously described.

Should the engineer for any reason shut off the locomotive throttle without at the same time pulling back on the reverse lever so as to release the plunger 65 the booster motor will be maintained in entrainment although it will not be functioning as a driving factor. When the reverse lever is pulled back and the plunger 65 released the entire booster system will be thrown out of operation and inasmuch as the reverse lever is kept in the corner or near the corner for a comparatively short time only it will be seen that the booster is used to aid the locomotive only in starting or at slow speeds.

The apparatus is very efficient and exceedingly simple when the number of the functions to be performed is considered. Entrainment is effected by the steam which drives the booster but driving does not take place until after entrainment has been completed. Idling of the booster is provided for and if after entrainment has taken place the operating steam is cut off from the booster the idling steam will act to maintain entrainment until such time as the booster is definitely cut out. Many other advantages will occur to those skilled in this art.

This lost motion connection 74, 75 prevents any vibration or movement which might be incident to the operation of the booster from being relayed back to the piston 11. This prevents wear of the parts and ensures a tight fit of the piston 11 against its seat 25 so as to prevent leakage of steam at this point.

I claim:—

1. The combination of a booster motor, an axle to be driven thereby, movable means for drivingly connecting the motor to the axle, a conduit for supplying the motor with steam, and a piston for controlling the flow of steam to the booster through said conduit, said piston being connected to the aforesaid movable means so as to move it to connect the motor to the axle for driving purposes but without opening the conduit and, thereafter, being further movable to open the conduit for driving purposes.

2. The combination of a booster motor, an axle to be driven thereby, a gear fixed on the axle, a gear driven by the booster, a movable idler gear, a conduit for supplying the booster with steam, a piston directly controlling the flow of operating steam through said conduit, and means for supplying a comparatively small quantity of steam to the booster independent of the control exercised by the piston, said piston being responsive to the pressure of the operating steam and connected to the movable idler gear so as to entrain it with the other gears prior to the time that it permits the passage of operating steam through the conduit.

3. In booster apparatus, the combination of a gear to be driven, a rotating movable gear, a movable power means for moving said gear into mesh with the gear to be driven, and a lost motion connection between said power means and said movable gear for permitting further movement of the power means after meshing has been effected.

4. In a booster equipment, a load carrying axle and its wheels, a gear on said axle, a driving gear, a booster motor for operating said driving gear, an entraining clutch means including an idler gear, stop means limiting the movement of the idler gear, a source of power for moving the idler gear into mesh, and a lost motion connection between said source of power and said idler gear whereby to break the otherwise rigid connection between said source of power and said stop means.

5. In a booster equipment, a load carrying axle and its wheels, a gear on said axle, a driving gear, a booster motor for operating said driving gear, an entraining clutch means including an idler gear, a rocker carrying the idler gear and normally in disentraining position, a source of power for shifting the rocker to entrain the gears, means limiting the entraining movement of the rocker, and a lost motion connection between said source of power and said rocker whereby to permit slight movement or vibration of the idler gear during operation without carrying said vibration back to the source of power.

6. In booster apparatus, the combination of an axle to be driven by the booster, movable means for drivingly connecting the booster to the axle, a movable power means for moving said connecting means, and a lost motion connection between said connecting means and said power means for permitting further movement of the power means after said connection has been effected.

7. The combination of a locomotive, a normally disentraining booster motor for aiding the locomotive, means automatically entraining the booster motor only during locomotive operation, and manually controlled means for idling the booster motor without causing entrainment thereof.

8. The combination of a locomotive, a normally disentrained booster motor for aiding the locomotive, means automatically entraining the booster motor and supplying it with steam only during locomotive operation, and means for supplying the booster with steam without causing entrainment.

9. The combination of a locomotive, a normally disentrained booster motor for aiding the locomotive, means for supplying steam to entrain and operate the booster motor, and means for supplying steam to idle the booster motor without causing entrainment.

10. The combination of a locomotive, a normally disentrained booster motor for aiding the locomotive, means for supplying steam to entrain and operate the booster motor, and means for supplying steam to the booster motor without causing entrainment, said last means functioning to disable the means for entraining and operating the booster motor.

11. A normally disentrained booster motor, control means for entraining and operating said motor, control means for operating it without entrainment thereof, and a means for selecting one or the other of said control means constructed to accomplish both the actuation of the control chosen and the disablement of the one not chosen.

12. A normally disentrained booster motor, means for idling it without entrainment, and means for entraining and operating it, said means for idling and said means for entraining and operating being constructed and arranged so that the means for idling will maintain entrainment even upon disablement of the means for entraining and operating.

13. A normally disentrained booster motor, movable means for entraining it, a conduit for booster steam supply, means for admitting operating pressure of steam to said conduit, means for admitting idling pressure of steam to said conduit, a piston in said conduit responsive to operating pressure of steam but not to idling pressure, said piston being operatively connected to the movable entraining means so as to cause entrainment when operating pressure is admitted and being arranged to control the flow of operating steam so that it will not reach the booster until after entrainment, and a by-pass around said piston for permitting idling steam to reach the booster.

14. The combination of a locomotive, means for supplying it with steam, a normally disentrained and inoperative booster motor, means for entraining and operating said motor, and a pilot device for controlling the means for entraining and operating the motor which device is responsive to the said steam supply means.

15. The combination with a locomotive and its steam supply line, of a booster motor, means for supplying it with steam from the locomotive steam supply line, a booster throttle valve for controlling the steam supply to the booster, motor means for opening the booster throttle, and a pilot device for said motor means responsive to pressure conditions in the locomotive supply line.

16. The combination with a locomotive and its steam supply line, of a normally disentrained and inoperative booster motor, means for entraining and operating said motor with steam from the locomotive supply line, means for idling said motor without entrainment with steam from an independent source, and a pilot device for said entraining and operating means responsive to pressure conditions in the locomotive supply line, said idling means, however, functioning in conjunction with the means for entraining and operating the motor and adapted to maintain entrainment when there is no steam in the locomotive supply line.

17. A normally inoperative disentrained booster motor, means for idling it at will without entrainment, and means for entraining and operating it, said means for idling and said means for entraining and operating being constructed and arranged so that the means for idling may be used independently of the means for entraining and operating.

18. The combination of a locomotive, a normally inoperative booster motor for aiding the locomotive, a controlling system for the booster dependent upon locomotive operation, and means for idling the booster motor at will independent of operation of the booster as a driving factor.

19. The combination of a locomotive, a normally inoperative booster motor for aiding the locomotive, a controlling system for the booster dependent upon locomotive operation, and means using a portion of the controlling system for idling the booster at will without operation of the booster as a driving factor.

20. A controlling system for a normally disentrained and inoperative locomotive booster comprising in combination a conduit through which steam is supplied to said booster to control its various functions, entraining means normally blocking the flow of steam thru said conduit, a comparatively small capacity by-pass around said entraining means, means for delivering steam through said conduit and said by-pass to idle the booster without causing entrainment, and means for delivering steam through said conduit to entrain the booster, open the conduit and operate the booster as a driving factor.

21. The combination of a locomotive, a normally inoperative booster motor, a controlling system for the booster dependent upon locomotive operation, and means for idling the booster motor at will regardless of whether or not the locomotive is being operated.

22. The combination of a locomotive, a normally disentrained booster motor, means automatically entraining the booster motor, and manually controlled means for idling the booster motor at will without causing entrainment thereof regardless of whether or not the locomotive is being operated.

In testimony whereof, I have hereunto signed my name.

FRANK R. PETERS.